E. W. SEALY.
VEHICLE WHEEL.
APPLICATION FILED OCT. 12, 1920. RENEWED MAY 3, 1922.
1,432,265. Patented Oct. 17, 1922.
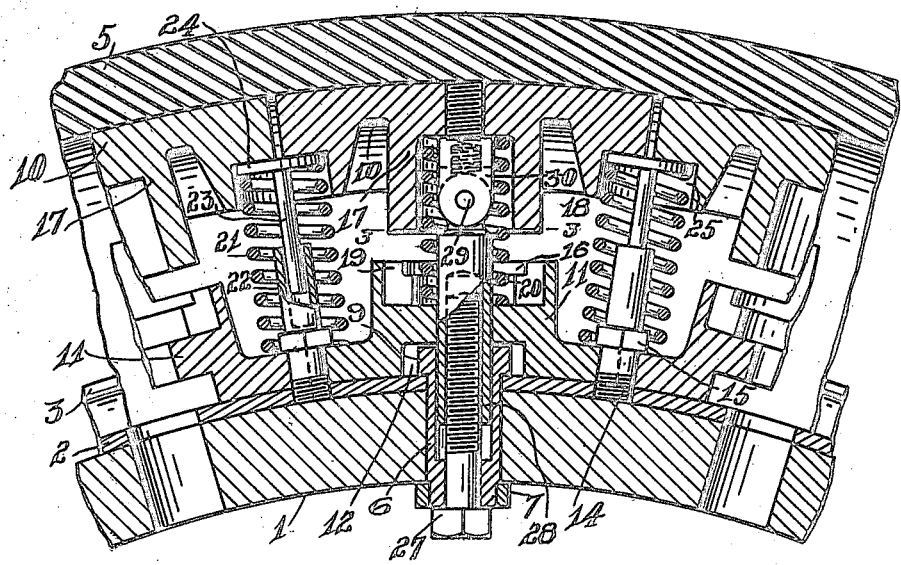
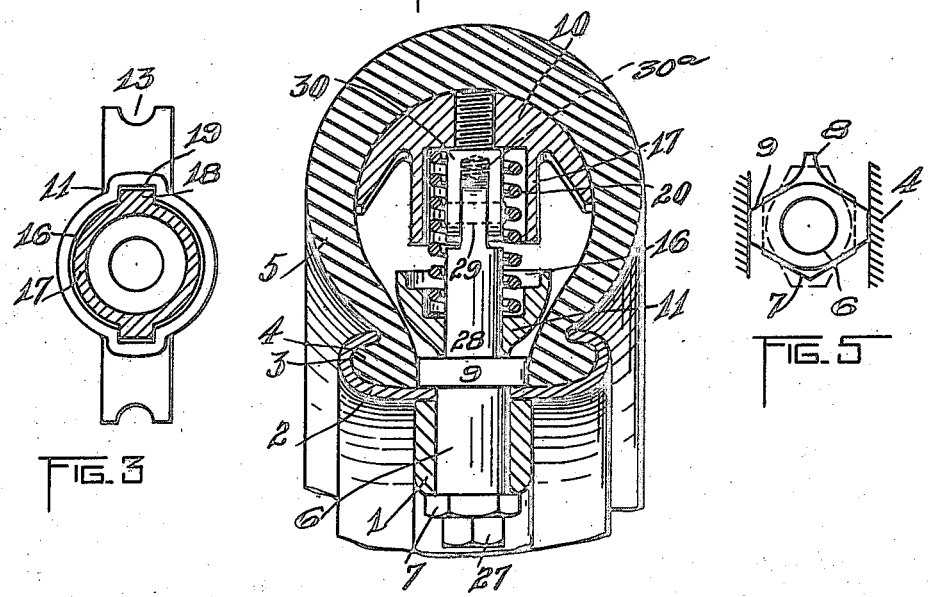
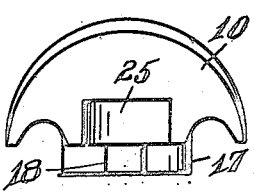
INVENTOR
Edward W. Sealy
BY
his ATTORNEYS Patented Oct. 17, 1922.

1,432,265

UNITED STATES PATENT OFFICE.

EDWARD W. SEALY, OF ROCHESTER, NEW YORK, ASSIGNOR OF FOUR-SIXTEENTHS TO MEYER DAVIS, OF ROCHESTER, NEW YORK.

VEHICLE WHEEL.

Application filed October 12, 1920, Serial No. 416,432. Renewed May 3, 1922. Serial No. 558,266.

*To all whom it may concern:*

Be it known that I, EDWARD W. SEALY, a citizen of the United States, and resident of Rochester, in the county of Monroe and State of New York, have invented certain new and useful Improvements in Vehicle Wheels, of which the following is a specification.

The present invention relates to vehicle wheels and more particularly to the type in which yieldingly mounted shoes are mounted upon a rim, an object of this invention being to provide a supporting means for the shoes so that they may rock as well as move inwardly in the plane of the wheel.

To this and other ends, the invention consists of certain parts and combinations of parts all of which will be hereinafter described, the novel features being pointed out in the appended claims.

In the drawings:—

Fig. 1 is a fragmentary sectional view in the plane of the wheel;

Fig. 2 is a transverse sectional view through the wheel;

Fig. 3 is a section on the line 3—3, Fig. 1;

Fig. 4 is an end of one of the shoes; and

Fig. 5 is a detail view showing the manner in which the tire casing is locked to the rim.

Referring more particularly to the drawings, 1 indicates the felloe of the wheel to which the spokes are secured in the usual manner. This felloe is surrounded by a metallic rim 2 which has its opposite edges turned outwardly and inwardly at 3 to provide overhanging flanges for receiving beads 4 formed along opposite edges of the tire casing 5 as is common in pneumatic tires. The beads 4 are held under the overhanging edges 3 of the rim in any suitable manner. In this instance a number of sleeves 6 are mounted to turn in the felloe and project at the opposite ends from the opposite faces of the rim. On the inwardly projecting portion of each sleeve, a nut 7 is arranged, which holds the sleeve in position and which also has a finger 8 acting as an indicator as will be more fully hereinafter described. On the outer end of each sleeve 6 a casing holding device 9 is provided, this device in this instance comprising two oppositely extending arms which secure the casing by abutting the inner edges of the casing, when the sleeve 6 is turned to one position as shown in Fig. 5 in full lines, and which free the edges of the tire casing when thrown to another position as indicated in dotted lines in Fig. 5. These two positions of the tire casing securing devices are indicated by the indicators 8 formed on the inner ends of the sleeves 6. The sleeves 6 are turned through the medium of the nut 7 on such sleeves.

Arranged within the casing 5 are a number of shoes 10 which have their outer faces curved transversely to conform to the transverse curvature of the inner wall of the tire casing and which are curved longitudinally to conform to the circumferential curve of the inner wall of the tire casing. These shoes are so mounted that they may move inwardly and also rock in the plane of the vehicle wheel. In this instance, this result is obtained by attaching to the rim 2 between the inwardly turning flanges 3 a number of frame pieces 11 which have pockets or recesses 12 on their under sides to receive the projecting ends 9 of the sleeves 6 while their opposed ends are provided with notches 13 in which fastening devices are arranged. These fastening devices, in this instance, have screw-threaded portions 14 engaged with the rim 2 and also have shoulder portions 15 which overhang two of the frames 11 adjacent the notches 13. Ribs 18 are provided on the shoes to be received within notches 19 formed in the frame pieces 11. The purpose of this construction is to hold the frame pieces and the shoes against turning when these parts are disconnected from the wheel and they have no function after the shoes and frame pieces have been installed on the wheel.

Each shoe is pressed outwardly by spring means which, in this instance, may consist of a helical spring 20 abutting the bottom of a pocket in the frame 11 and the bottom of the pocket in the projection 17. In addition, the opposed ends of adjacent shoes are acted upon by helical springs 21 which seat upon two of the frames 11 about the fastening devices. A projecting tubular portion 22 is provided on each fastening device and in this tubular portion a stem 23 operates, said stem having at its outer or free end a disk 24. This disk receives the seats 25 formed on two adjacent shoes 10 and is held against said seats by a helical spring 21.

Suitable means is employed for restraining the movement of the shoes outwardly under the spring means. This restraining means also is adjustable in order to vary the tension of the spring means and furthermore to permit the shoes to be thrown inwardly in order to facilitate the removal of the tire casing. In this instance, this adjustable restraining device comprises a screw or bolt 27 rotatably mounted within the sleeve 6 with its head arranged on the inner side of the felloe 1, and its screw portion operating within an internally threaded nut or socket member 28, which is also guided within the sleeve as well as within the frame 11. This socket member is pivotally connected at 29 to a projection 30, which is secured to the shoe 10 within the socketed projection 17. A helical spring 30ª is arranged in a pocket in the projection 30 to bear on the socket member 28 in order to produce pressure on said member for taking up any wear on the pivot pin 29. The spring 20 surrounds the socketed member 28 and the projection 30 to which said socketed member is pivoted.

In attaching the tire casing 5 the tire securing devices 9 are turned to the positions shown in dotted lines, Fig. 5, and the screw bolts 27 are turned to draw the shoes 10 inwardly, thus compressing the springs 20 and 21. The tire casing is then fitted over the shoes and its beads are introduced beneath the overhanging flanges 3 of the rim 2. The tire securing devices 9 are now turned to the full line position of Fig. 5, so that the beaded edges of the tire casing are held beneath the overhanging portions 3 of the rim. The bolts 27 may now be turned to permit the outward movement of the shoes under the action of the spring means, this movement being continued until such a time that the tire casing is properly distended. The wheel is now in condition for use. Whenever the weight of the vehicle is upon any one of the shoes, such shoe moves inwardly, not only compressing the spring 20, but also compressing the springs 21 at opposite ends of such shoe.

From the foregoing it will be seen that there has been provided a shoe which is mounted upon the rim so as to partake of an inward movement as well as a rocking movement in the plane of the wheel. The shoe is held by adjusting means which provides for the rocking movement as well as the inward movement of the shoe, this being due to the fact that the adjusting means is pivotally connected to the shoe and also has a sliding movement in the rim.

What I claim as my invention and desire to secure by Letters Patent is:—

1. In a vehicle wheel, a rim, a plurality of shoes, spring means acting on the shoes to move the latter outwardly, and adjusting means for varying the tension on the spring means, comprising a part pivotally connected to each shoe and slidably mounted on the rim, said part having a socket with internally threaded walls and a second screw-threaded part operable from the inner face of the rim and operating in the socket of the first named part.

2. In a vehicle wheel, a rim having inwardly turned flanges along opposite edges, a casing having beads along opposite edges received beneath said flanges, frame pieces secured to the rim between the flanges and provided with sockets, shoes having hollow projections, springs received within said hollow projections and socketed frame pieces, adjusting means for varying the tension of said springs, said adjusting means each including a screw-threaded member pivotally connected to each of the shoes and guided in said frame piece, and a screw-threaded member cooperating with each of said first named screw-threaded members and operable from the inner side of the rim.

3. In a vehicle wheel, a rim, a plurality of shoes mounted on the rim and adapted to move toward and from the rim and to rock in the plane of the rim, and spring pressed disks guided on the rim and each bearing against two of the shoes.

4. In a vehicle wheel, a rim, a plurality of frames, fastening devices for securing said frames to the rim, said fastening devices each having a socket, shoes, adjustable restraining means connecting the rim and the shoes, and spring-pressed disks each having a stem guided in a socket of one of the fastening devices, each disk cooperating with two of the shoes.

EDWARD W. SEALY.